United States Patent
Kang et al.

(10) Patent No.: US 9,560,087 B2
(45) Date of Patent: Jan. 31, 2017

(54) PROVIDING MACHINE-TO-MACHINE SERVICE

(71) Applicant: KT CORPORATION, Gyeonggi-do (KR)

(72) Inventors: Su-Jin Kang, Seoul (KR); Sung-Phil Heo, Seoul (KR); Sang-Eon Kim, Seoul (KR); Yeon-Soo Kim, Gyeonggi-do (KR); Han-Wook Jung, Seoul (KR)

(73) Assignee: KT CORPORATION, Gyeonggi-do (KR)

(*) Notice: Subject to any disclaimer, the term of this patent is extended or adjusted under 35 U.S.C. 154(b) by 291 days.

(21) Appl. No.: 13/774,660

(22) Filed: Feb. 22, 2013

(65) Prior Publication Data

US 2013/0227036 A1 Aug. 29, 2013

(30) Foreign Application Priority Data

Feb. 23, 2012 (KR) .................. 10-2012-0018678

(51) Int. Cl.
*H04W 4/00* (2009.01)
*H04L 29/06* (2006.01)
*H04W 4/12* (2009.01)

(52) U.S. Cl.
CPC .............. *H04L 65/40* (2013.01); *H04W 4/005* (2013.01); *H04W 4/12* (2013.01)

(58) Field of Classification Search
CPC   H04L 43/0811; H04L 43/0817; H04L 67/303; H04L 67/36; H04L 67/42; H04W 4/001; H04W 4/003; H04W 4/005; G06F 9/4443; G06F 9/46

See application file for complete search history.

(56) References Cited

U.S. PATENT DOCUMENTS

| 7,899,903 | B2 | 3/2011 | Sanghvi et al. |
| 8,040,232 | B2 | 10/2011 | Oh et al. |
| 8,325,614 | B2* | 12/2012 | Poon .................. H04L 43/0811 370/241 |
| 8,949,370 | B1 | 2/2015 | Wu et al. |
| 9,047,103 | B2* | 6/2015 | Fortune ................. G06F 9/4448 |
| 2002/0129096 | A1* | 9/2002 | Mansour et al. ............. 709/203 |
| 2004/0015809 | A1 | 1/2004 | Cheng |
| 2005/0108504 | A1* | 5/2005 | Cowin et al. .................... 712/32 |
| 2007/0130523 | A1 | 6/2007 | Ku et al. |
| 2007/0201093 | A1 | 8/2007 | Johnson et al. |
| 2008/0092052 | A1* | 4/2008 | Mathews et al. ............. 715/736 |
| 2009/0217364 | A1* | 8/2009 | Salmela et al. .................... 726/6 |

(Continued)

FOREIGN PATENT DOCUMENTS

| KR | 10-2001-0091448 A | 10/2001 |
| KR | 10-2003-0022286 A | 3/2003 |

(Continued)

*Primary Examiner* — Ramy M Osman
(74) *Attorney, Agent, or Firm* — IP Legal Services, LLC (57) ABSTRACT

The disclosure is related to providing a machine to machine (M2M0 service. A user interface (UI) template associated with a M2M device may be retrieved when a message is received from the M2M device. Then, data collected from the M2M device may be combined with the retrieved UI template. The M2M service associated with the M2M device may be provided by embedding the combined data to application data for producing a M2M service user interface (UI) of the associated M2M service.

16 Claims, 5 Drawing Sheets

(56) References Cited

U.S. PATENT DOCUMENTS

| | | | |
|---|---|---|---|
| 2009/0239587 A1* | 9/2009 | Negron | G06F 3/04883 455/566 |
| 2010/0302009 A1* | 12/2010 | Hoeksel et al. | 455/41.1 |
| 2011/0164511 A1* | 7/2011 | Poon et al. | 455/424 |
| 2011/0179346 A1 | 7/2011 | Dufour et al. | |
| 2011/0249636 A1* | 10/2011 | Cherian | H04L 29/12801 370/329 |
| 2011/0252235 A1* | 10/2011 | Dolan | H04L 29/12801 713/168 |
| 2012/0127011 A1* | 5/2012 | Lee et al. | 341/176 |
| 2012/0203894 A1* | 8/2012 | Lee | H04W 8/18 709/224 |
| 2012/0264443 A1 | 10/2012 | Ng et al. | |
| 2012/0327945 A1* | 12/2012 | Li | 370/401 |
| 2013/0029713 A1* | 1/2013 | Jang | H04W 24/10 455/517 |
| 2013/0124712 A1 | 5/2013 | Parker | |
| 2013/0142118 A1 | 6/2013 | Cherian et al. | |
| 2013/0203394 A1 | 8/2013 | Dong et al. | |
| 2013/0205212 A1 | 8/2013 | Sinha et al. | |

FOREIGN PATENT DOCUMENTS

| | | |
|---|---|---|
| KR | 10-2007-0057646 A | 6/2007 |
| KR | 10-0793057 B1 | 1/2008 |
| KR | 10-2008-0049757 A | 6/2008 |
| KR | 10-2010-0037370 A | 4/2010 |
| KR | 10-2010-0099625 A | 9/2010 |
| KR | 10-2011-0003989 A | 1/2011 |
| KR | 10-2011-0117030 A | 10/2011 |

* cited by examiner

PROVIDING MACHINE-TO-MACHINE SERVICE

CROSS REFERENCE TO PRIOR APPLICATIONS

The present application claims priority under 35 U.S.C. §119 to Korean Patent Application No. 10-2012-0018678 (filed on Feb. 23, 2012), which is hereby incorporated by reference in its entirety.

The subject matter of this application is related to U.S. patent application Ser. No. 13/774,389 filed Feb. 22, 2013, the teachings of which are incorporated herein their entirety by reference.

BACKGROUND OF THE INVENTION

Machine-to-Machine (M2M) communication is a form of data communication that involves one or more entities (e.g., devices) that do not necessarily require human interaction or intervention in the process of communication. The M2M communication may also be referred to as a machine type communication (MTC) or a machine intelligence communication. The M2M communication may extend human-centered internet infrastructure to a human-to-machine domain and/or a machine-to-machine domain where information can be sensed and transmitted not by human beings but by machines. The M2M communication may be related to a ubiquitous technology.

The M2M communication may enable different types of services that are valuable to an end user. For example, M2M communication services may include smart metering, healthcare monitoring (e.g., patient monitoring), fleet management and tracking, remote security sensing, smart grid, telemetry, weather monitoring, home automation, and so forth.

M2M architecture may include a variety of elements such as M2M devices (e.g., a sensor, an actuator, etc.), M2M area network, M2M communication network (e.g., a core network), M2M gateway (i.e., a system connecting the M2M area network and the M2M communication network), and/or an M2M application service server. Herein, a plurality of M2M devices may be connected by the M2M area network (e.g., a capillary network). Typically, M2M applications may be configured or developed based on M2M platforms (e.g., an M2M application platform). The M2M platforms may be used to provide a variety of M2M application services based on the collected device data.

Such M2M application services may be provided through a M2M service UI displayed on a user terminal as a result of the execution of a M2M application. Such M2M application and the M2M service UI may be dedicatedly designed according to a specific M2M device. Data may be collected from the specific M2M device and application data may be generated based on the collected data. The M2M service UI dedicated to the specific M2M device may be produced based on the application data and displayed on a user terminal.

SUMMARY OF THE INVENTION

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, a M2M device may be self-registered at a M2M platform server upon the initiation activation of the M2M device.

In accordance with another aspect of the present invention, a M2M service may be provided to a user with information on a newly installed M2M device embedded thereto.

In accordance with an embodiment of the present invention, a method may be provided for providing a machine to machine (M2M) service to a user. The method may include retrieving a user interface (UI) template associated with a M2M device when a message is received from the M2M device, combining data collected from the M2M device with the retrieved UI template, and providing a M2M service associated with the M2M device by embedding the combined data to application data for producing a M2M service user interface (UI) of the associated M2M service.

In accordance with another embodiment of the present invention, an apparatus may be provided for providing a machine to machine (M2M) service. The apparatus may be configured to retrieve a user interface (UI) template associated with a M2M device when a message is received from the M2M device, combine data collected from the M2M device with the retrieved UI template, and provide a M2M service associated with the M2M device by embedding the combined data to application data for producing a M2M service user interface (UI) of the associated M2M service.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Reference will now be made in detail to embodiments of the present invention, examples of which are illustrated in the accompanying drawings, wherein like reference numerals refer to like elements throughout. The embodiments are described below, in order to explain the present invention by referring to the figures.

In accordance with at least one embodiment of the present invention, a M2M device may be self-registered at a M2M platform server upon the initial activation of the M2M device. Furthermore, a M2M service associated with the self-registered M2M device may be provided to a related user with information on the self-registered M2M device embedded to the M2M service. Such operation of providing a M2M service in accordance with at least one embodiment of the present invention will be described in reference to FIG. 1.

Figure 1:
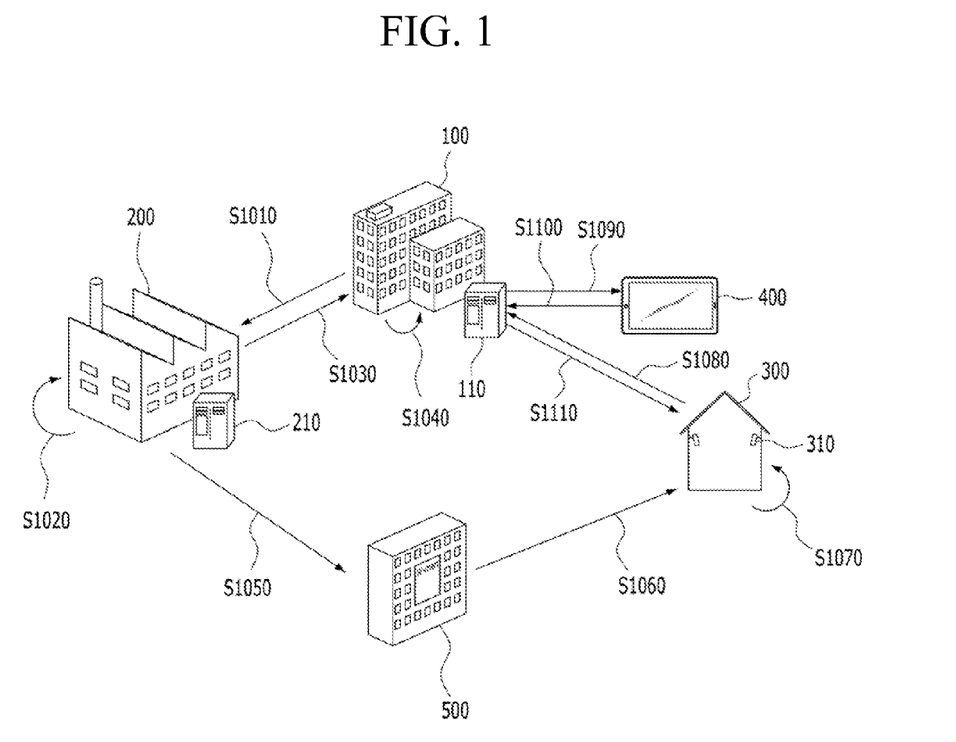
FIG. 1 is an overall view of providing a M2M service in accordance with at least one embodiment of the present invention.

FIG. 1 is an overall view of providing a M2M service in accordance with at least one embodiment of the present invention.

Referring to FIG. 1, M2M service provider 100 may be an entity that provides M2M services to an end user. M2M service provider 100 may design and develop a M2M service and provide such M2M service to an end user through a M2M system. In general, the M2M system may include M2M platform server 110, at least one of M2M devices 310, a M2M gateway (500 in FIG. 5), user terminal 400, and various types of communication networks.

Such M2M service provider 100 may be a company equipped with M2M platform server 110. M2M service provider 100 may provide a M2M service to an end user through M2M platform server 110 coupled to a communication network. Particularly, M2M platform server 110 may collect data from at least one M2M device, which is generally required to provide a desired M2M service to an end user. M2M platform server 110 may process the collected data in response to an input from the end user and provide the processing result to the end user. In order to process and to provide the result, M2M platform server 110 may provide a M2M application to the end user. Such M2M application may be software such as a mobile App to be installed in user terminal 400. As a result of the execution of the M2M application, a M2M service user interface (UI) may be displayed on user terminal 400. Through the M2M service UI, M2M platform server 110 may receive a user input to process data collected from M2M device 310 and provide the processed data to an end user in accordance with at least one embodiment of the present invention. Such M2M service UI may be generated based on application data generated in M2M platform server 110. The application data may be generated by combining data collected from at least one M2M device 310 with an associated UI template in accordance with at least one embodiment of the present invention.

As described, in order to provide M2M service, M2M service provider 100 may include at least one M2M device 310 that collects data related to a M2M service that M2M service provider 100 desires to provide. Such M2M device 310 may be developed and manufactured by M2M device manufacturer 200. In order to enable M2M device manufacturer 200 to develop and manufacture the M2M device that satisfies requirements of a desired M2M service, M2M service provider 100 may provide a development tool to M2M device manufacturer 200 through M2M platform server 110. The development tool may include information on a M2M device, which is required to manufacture a M2M device for the specific M2M service. For example, the development tool may include specification of a desired M2M device, such as a data type, a data range, a device ID, a control type, and likes. Furthermore, the development tool may include a software development kit (SDK) or a Java developer's kit (JDK). Due to the provided development tool, M2M device manufacturers might be enabled to manufacture various types of M2M device stratifying requirements of a related M2M service and to sell the M2M devices directly to ea end user through a store. In this way, an end user may purchase a M2M device directly from a market and to self-install the M2M device at a desired location without intervention of M2M service provider 100 and/or M2M device manufacturer 200 in accordance with at least one embodiment of the present invention.

M2M device manufacturer 200 may be a manufacturing company that manufactures a M2M device collecting or sensing data in a predetermined location for providing a M2M service. M2M device manufacturer 200 may include manufacturing system 210 that interacts with M2M platform server 110 of M2M service provider 100. M2M device manufacturer 200 may receive a development tool for a specific M2M device through manufacturing system 210 and manufacture a specific M2M device based on the received development tool. M2M device manufacturer 200 may sell the produced M2M device directly to an end user through a store or a shop, for example, Wal-Mart or Amazon.com. Typically, M2M device manufacturer 200 may receive a request to manufacture a specific M2M device from M2M service provider 100. After M2M device manufacturer 200 manufactures the requested M2M device and M2M device manufacturer 200 delivers the M2M device to M2M service provider 100. During the manufacturing, M2M device manufacture 200 performs an authentication process of the manufactured M2M device with a communication service provider. After delivering, M2M service provider 100 installs the M2M device at a specific location and M2M service provider 100 provides a specific M2M service to an end user through the installed M2M device. In such a typical way of providing the M2M device, the end user is usually forcibly tied to a M2M device that M2M service provider 100 provides.

In accordance with at least one embodiment of the present invention, M2M device manufacturer 200 manufactures a M2M device based on the development tool provided from M2M service provider 100 and requests M2M platform server 110 to inspect and to determine whether the manufactured M2M device satisfies the requirements for a desired M2M service. Such inspection may be requested and performed through transmitting an approval request message to M2M platform server 110 through manufacturing system 210 in accordance with at least one embodiment of the present invention. After the approval of the manufactured M2M device, the M2M device may be sold directly to an end user through a corresponding store. That is, M2M service provider 100 may enable users to purchase a M2M device from a store and to use a related M2M service using the purchased M2M device. Accordingly, the end user may experience greater convenience and less restriction from M2M service provider 100.

M2M device 310 may collect data required for a specific M2M service and provide the collected data to M2M platform server 110 in accordance with at least one embodiment of the present invention. Such M2M device 310 may include at least one sensor, a computing processor, a memory, and a communication module. For example, M2M device 310 may be a security device such as an alarm system, a tracking and tracing device, a payment device, a health monitoring device, a remote maintenance/control device, a metering device, and so forth. More particularly, M2M device 310 may include a temperature control device, a humidity control device, an air conditioning device regulating indoor air quality (IAQ), a heating device, a weighing machine, a motion sensor, an alarm system, an actuator, and so forth.

In accordance with at least one embodiment of the present invention, an end user may purchase M2M device 310 from a store and self-install M2M device 310 at a specific location or an object to collect desired data for a specific M2M service. When the end user initially activates M2M device 310 after the self-installation of M2M device 310, M2M device 310 may perform a self-registration procedure for registering with M2M platform server 110 in accordance with at least one embodiment of the present invention. During the self-registration procedure, M2M device 310 may be mapped to a corresponding UI template. Data collected from M2M device 310 may be combined with the corresponding UI template. The combined data may be embedded to a M2M service UI that is generated and displayed on user terminal 400 as a result of the execution of a corresponding M2M application. Such a self-registration procedure will be described in detail with reference to FIG. 2. After the self-registration, M2M device 310 may collect data and transmit the collected data to M2M platform server 110. Furthermore, M2M device 310 may be controlled by user terminal 400 through M2M platform server 110 in response to a user input received through a M2M service UI displayed on user terminal 400, as a result of the execution of an associated M2M application installed in user terminal 400 in accordance with at least one embodiment of the present invention.

User terminal 400 may be a device that an end user uses for a M2M service in accordance with at least one embodiment of the present invention. User terminal 400 may be coupled to and communicate with M2M platform server 110 through a communication network. For example, user terminal 400 may include a handheld device, a portable device, a mobile phone, a smart phone, a tablet personal computer (PC), a pad-type device, a personal digital assistance, a laptop computer, a desktop computer, and likes. User terminal 400 may download a M2M application from M2M platform server 110 and install the downloaded M2M application. User terminal 400 may display a M2M service UI produced as a result of the execution of the related M2M application. Through such a M2M service UI, user terminal 400 may provide the collected and processed data from the M2M device and receive an input from an end user for processing the collected data or for controlling the M2M device in accordance with at least one embodiment of the present invention. Such M2M service UI may be produced based on application data generated by combining collected data with at least one associated UI template. The UI template may be created in association with a M2M device and stored in M2M platform server 110 with identification (ID) such as a user ID or a M2M device ID in accordance with at least one embodiment of the present invention. Such UI template may be retrieved based on information in a M2M service request message and combined with data collected from associated M2M device 310. Then, application data for a M2M service UI may be generated based on the combined data and the M2M service UI may be displayed based on the application data on user terminal 400. Such operation may be performed by one of user terminal 300 and M2M platform server 110. Hereinafter, a general procedure of providing a M2M service in accordance with at least one embodiment of the present invention will be described with reference to FIG. 1.

At step S1010, M2M platform server 110 of M2M service provider 100 provides a development tool to manufacturing system 210 of M2M device manufacturer 200 for manufacturing a M2M device related to a specific M2M service. At step S1020, M2M device manufacturer 200 manufactures M2M device 310 based on the provided development tool. At step S1030, M2M device manufacturer 200 transmits an approval request message to M2M platform server 110 in order to requests M2M platform server 110 to approve M2M device 310. In this process, M2M platform server 110 may inspect the specification of M2M device 310 to determine whether M2M device 310 satisfies the requirements of an associated M2M service.

As described, an end user may be enabled to purchase M2M devices from a shop and to self-install the M2M device at a desired location in accordance with at least one embodiment of the present invention. Accordingly, it may be necessary that a data format of data transmitted and received between M2M device 310 and M2M platform server 110 might be identical to a data format of data transmitted and received between M2M platform server 110 and user terminal 400.

Upon the approval of M2M device 310 from M2M platform server 110, M2M platform server 110 produces a related M2M application including a UI template based on the profile of M2M device 310 at step S1040. Furthermore, M2M device manufacturer 200 sells M2M device 310 directly to an end user through store 500 at step S1050. The end user purchases M2M device 310 from store 500 at step S1060 and self-installs M2M device 310 at a desired location without intervening of M2M device manufacturer 200 and M2M service provider 100 at step S1070. M2M device 310 performs a self-registration process for registering itself at M2M platform server 100 in association with a corresponding user upon the initial activation of M2M device 310, collects data, and transmits the collected data to M2M platform server 100 at step S1080.

User terminal 400 may download a M2M application associated with a desired M2M service, install the downloaded M2M application, and use a related M2M service through a M2M service UI displayed as a result of the execution of the M2M application at step S1090. Such a M2M service UI may be produced based on application data generated by combining data collected from M2M device 310 and associated UI template in accordance with at least one embodiment of the present invention. At step S1100, user equipment 400 may transmit a control request to M2M platform server 100 to control M2M device 310 in response to a user input received through the M2M service UI based on collected data provided through the M2M service UI. At step S1110, M2M platform server 100 controls M2M device 310 in response to the control request from user terminal 400.

As described above, an end user may be enabled to purchase a desired M2M device directly from a store and self-install the M2M device at a desired location without intervening of M2M device manufacturer 210 and M2M service provider 110 in accordance with at least one embodiment of the present invention. After the self-installation, the M2M device may perform a self-registration process upon the initial activation of the M2M device. Such operation will be described in detail with reference to FIG. 2.

Figure 2:
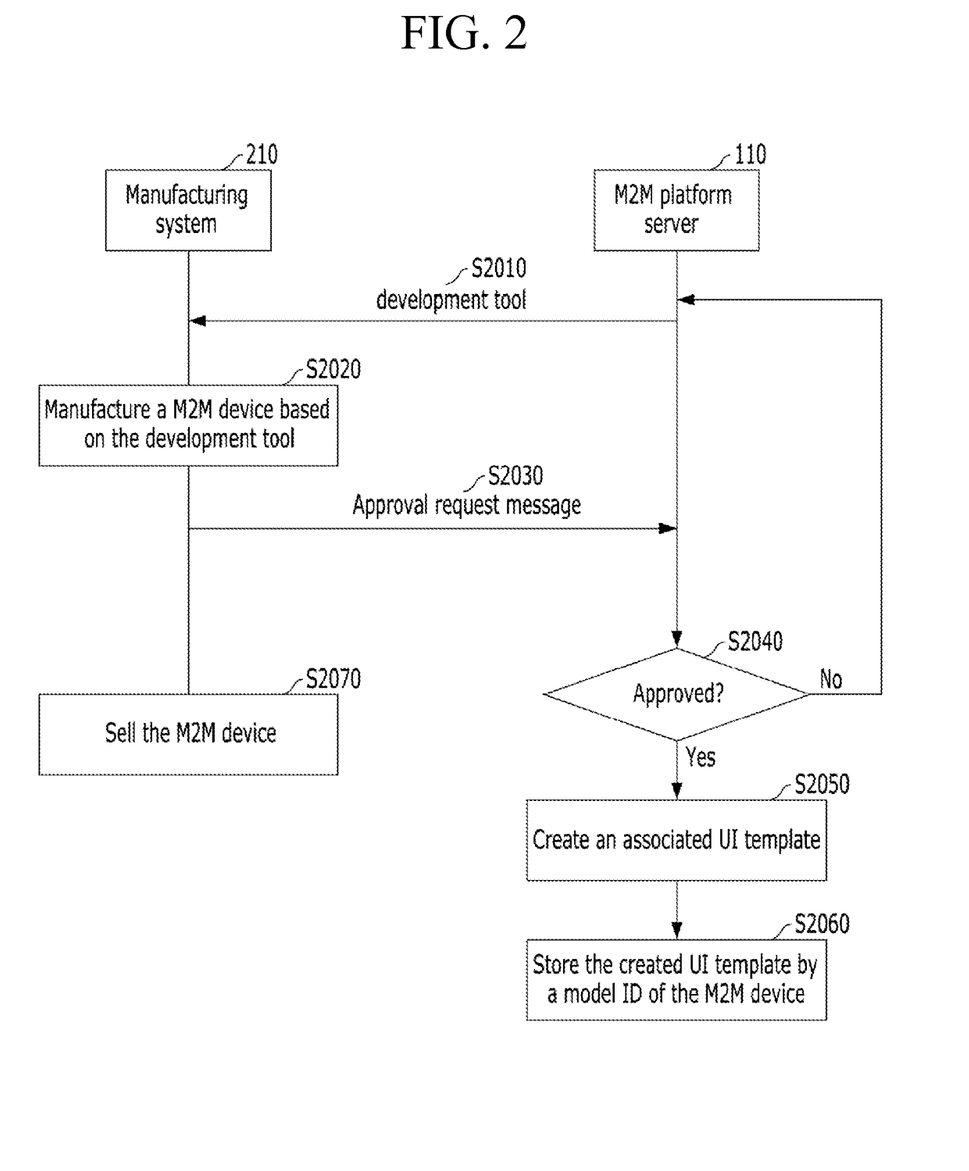
FIG. 2 shows a procedure for manufacturing and approving a M2M device in accordance with at least one embodiment of the present invention.

FIG. 2 shows a procedure for manufacturing and approving a M2M device in accordance with at least one embodiment of the present invention.

Referring to FIG. 2, a development tool may be provided to a M2M device manufacturing system at step S2010. For example, M2M service provider 100 may design or develop a M2M service and provide a development tool to M2M device manufacture 200 in order to enable M2M device manufacturer 200 to manufacture a M2M device that satisfies requirements of the developed M2M service. Such a development tool may be transmitted through M2M platform server 110 of M2M service provider 100 and manufacturing system 210 of M2M device manufacturer 200. For example, the development tool may include information on specification of a desired M2M device, which may be required to provide the developed M2M service. Particularly, the development tool may include information on a data type, a data range, and a data format of data produced by the M2M device, a control type for controlling the M2M device, a communication protocol, a device ID, and so forth. Furthermore, the development tool may include SDK or JDK.

At step S2020, a M2M device may be manufactured based on the provided development tool. For example, M2M device manufacturer 200 manufactures M2M device 310 based on the provided development tool from M2M service provider 100 through M2M platform server 110. That is, M2M device manufacture 200 manufactures M2M device 310 to satisfy requirements for providing a predetermined M2M service based on the development tool.

At step S2030, an approval request message may be transmitted to M2M platform server 110 in order to determine whether the manufactured M2M device satisfies the requirements for providing a related M2M service. That is, the approval request message may be for inspecting M2M device 310 whether M2M device 310 will be applied to a related M2M service. For example, manufacturing system 210 transmits the approval request message to M2M platform server 110 after manufacturing M2M device 310. Such an approval request message may include a M2M device profile. The M2M device profile may include, but is not limited to, information on a model ID of the M2M device, a data type, a data range, and a data format of data produced by M2M device 310, and a control type for controlling M2M device 310.

Particularly, the model ID of M2M device 310 may be identification to identify the M2M device from the others. Such model ID may be a set of numbers, characters, and combination thereof. The data type of data produced by the M2M device may be determined according to a type of a M2M device. For example, when a M2M device is a thermometer, the data type of data or message produced by the M2M device may be a data type of <temperature>. Such a data type may further include sub data types, such as <current>, <maximum>, and <minimum>.

The data range may be determined according to a type of M2M device 310 and a data type of data produced by M2M device 310. For example, when M2M device 310 is a thermometer, the data range may be −50 to 100° C.

The control type for controlling M2M device 310 may be determined according to a type of M2M device 310. For example, when M2M device 310 is a thermometer, the control type may be <cooling> or <heating>. Furthermore, the control type may include sub-control type such as <cooling=3° C.>.

At step S2040, the M2M device may be inspected whether the M2M device will be applied to a related M2M service in response to the approval request message. For example, M2M platform server 110 may inspect M2M device 310 whether to apply M2M device 310 to the related M2M service based on the device profile included in the approval request message. That is, M2M platform server 110 may determine whether the M2M device is manufactured to satisfy the requirements for providing a related M2M service.

When the M2M device is not approved to be applied for the related M2M service (No—S2040), the process returns to S2010 with communication to M2M platform server 110.

When the M2M device is approved to be applied for the related M2M service (Yes—S2040), a user interface (UI) template associated with the M2M device may be created at step S2050. The UI template may be a set of rules or setting for processing and providing data collected from an associated M2M device. Such UI template may include information on a data type, a data range, a data format of data produced by the associated M2M device, a control type of controlling the associated M2M device, and formats of an associated graphic user interface. With the data collected from the associated M2M device, the UI template may generate application data to be provided to user terminal 400. User terminal 400 may produce and display a M2M service UI thereon. Through the M2M service UI, a user may be enabled to use a related M2M service and to control associated M2M devices.

At step S2060, the created UI template may be mapped to a model ID of the associated M2M device and the mapping relation may be stored. For example, M2M platform server 110 may map the created UI template with a model ID of M2M device 310 and store information on the mapping relation between the created UI template and the model ID of M2M device 310.

At step S2070, the approved M2M device may be sold directly to an end user through a store. For example, M2M device manufacturer 200 may sell the approved M2M device directly to an end user through store 500.

After the end user purchases a desired M2M device, the end user may self-install the M2M device at a desired location and initially activate the M2M device. Upon the initial activation of the M2M device, the M2M device may perform self-registration at M2M platform server 110 and a related M2M service may be provided to the end user based on data collected from the M2M device in accordance with at least one embodiment of the present invention. Such operation will be described in detail with reference to FIG. 3.

Figure 3:
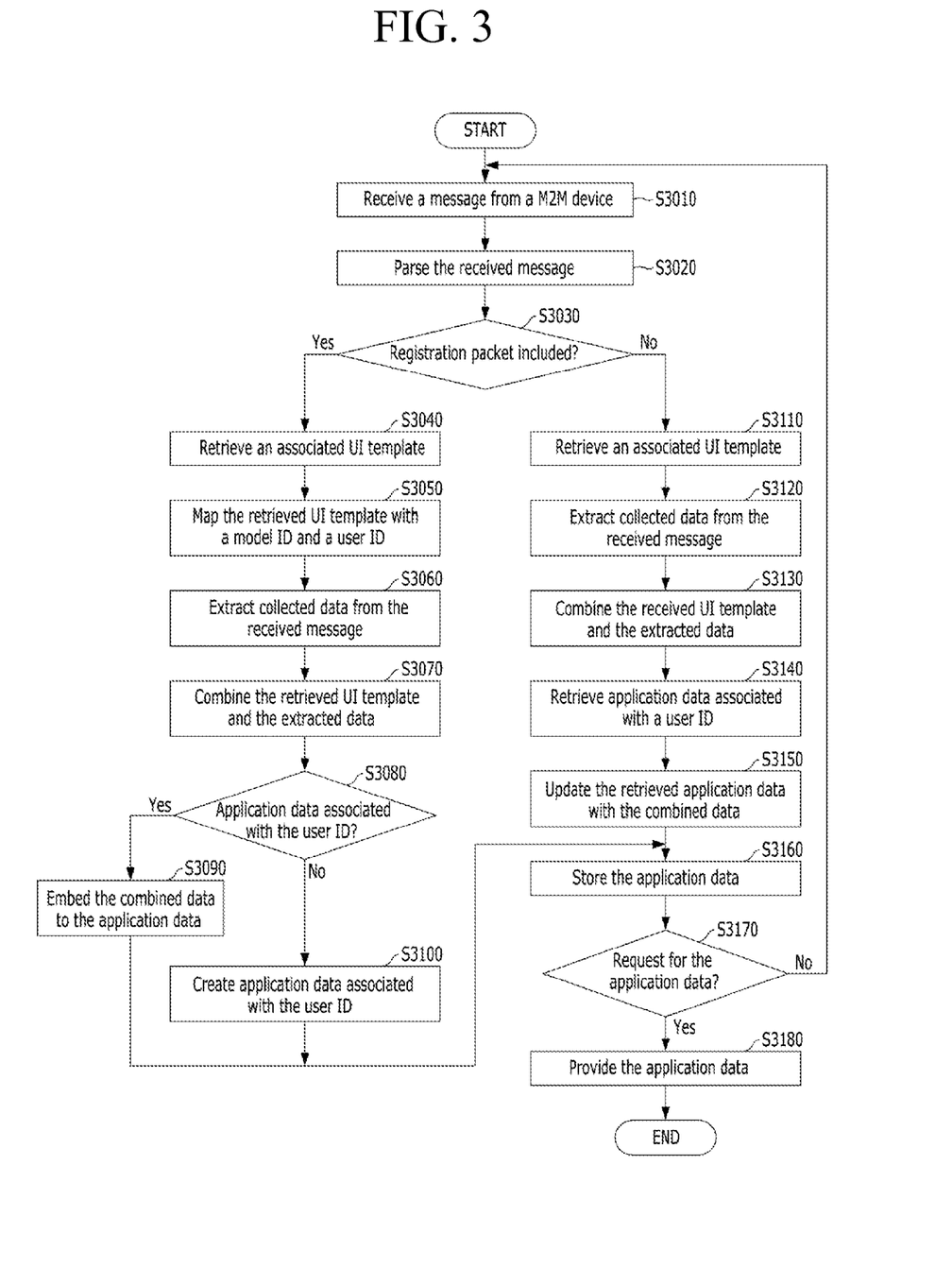
FIG. 3 shows a procedure for self-registering a M2M device and providing a related M2M service based on data collected from the M2M device in accordance with at least one embodiment of the present invention.

FIG. 3 shows a procedure for self-registering a M2M device and providing a related M2M service based on data collected from the M2M device in accordance with at least one embodiment of the present invention.

Referring to FIG. 3, a message may be received from a M2M device at step S3010. For example, after an end user installs M2M device 310 at a desired location and initially activates M2M device 310, M2M device 310 is coupled to a communication network and transmits a message to M2M platform server 110. Such message may be referred to as a notification message. Particularly, the notification message may include a registration packet. The received message may include information on a model ID, a MAC ID, and a user ID of M2M device 310. Furthermore, the received message may include data collected from M2M device 310.

The model ID of M2M device 310 may be identification to identify M2M device 320 from others, as described with reference to FIG. 2. Such a model ID may be a set of numbers, characters, or combination thereof. The MAC ID of M2M device 310 may be also identification to identify M2M device 320 from others. The MAC ID may be assigned to M2M device 310 during manufacturing M2M device 310. The MAC ID is a unique ID assigned to each one of M2M devices. Accordingly, M2M devices have different and unique MAC ID although the M2M devices are the same type M2M devices. The user ID of M2M device 310 may be identification to identify a user of M2M device 310 from other users. An end user may be enabled to generate such user ID through a M2M service homepage associated with a M2M service that the end user wants, but the present invention is not limited thereto.

Furthermore, the notification message may include a registration packet. The registration packet may indicate that an associated M2M device is initially activated and may be required to be registered at M2M platform server 110 with a related UI template.

At step S3020, the received message may be parsed. For example, M2M platform server 110 parses the received message in order to analyze the message and to find the registration packet as well as other information such as a user ID, a model ID, and so forth. During parsing, errors in the message may be detected.

At step S3030, determination may be made so as to whether the registration packet is included in the received message. For example, M2M platform server 110 determines whether the registration packet is included in the received message based on the parsing result.

When the registration packet is included (Yes—S3030), at step S3040, a UI template associated with a model ID and/or a user ID included in the message may be retrieved. For example, when the registration packet is included in the received message, M2M platform server 110 may determine that associated M2M device 310 is initially activated after the installation. Accordingly, M2M platform server 110 retrieves a UI template associated with M2M device 310 and registers M2M device 310 with the associated UI template in accordance with at least one embodiment of the present invention. In order to retrieve, M2M platform server 110 extracts the model ID and/or the user ID from the received message based on the parsing result. Based on the extracted model ID and/or the user ID, M2M platform server 110 retrieves an associated UI template from memory (e.g., memory 106 described subsequently in FIG. 4). As described with reference to FIG. 2, the UI template associated with M2M device 310 may be created and stored with mapping information to an associated M2M device when the associated M2M device is manufactured based on the provided development tool.

At step S3050, the retrieved UI template may be mapped with the model ID and/or the user ID of the M2M device transmitting the message and information on the mapping relation between the retrieved UI template and the model ID and/or the user ID may be stored. For example, M2M platform server 110 maps the retrieved UI template to the model ID and/or the user ID of M2M device 310 that transmits the message. Such mapping may be expressed as [user ID—model ID—UI template]. This mapping may indicate who uses which M2M device and is associated with which UI template. After mapping, M2M platform server 110 stores the information on the mapping relation between the retrieved UI template and the model ID and/or the user ID in memory (e.g., memory 106 described subsequently in FIG. 4).

At step S3060, data collected from the associated M2M device may be extracted from the received message. For example, M2M platform server 110 may extract collected data from the received message, but the present invention is not limited thereto. The received message may be delivered to user terminal 400 and user terminal 400 may extract the collected from the message. The collected data may be data collected from M2M device 310 related to a desired M2M service.

At step S3070, the retrieved UI template may be combined with the extracted data. For example, M2M platform server 110 may combine the retrieved UI template with the extracted data, but the present invention is not limited thereto. User terminal 400 may combine the retrieved UI template with the extracted data. Such combined data may be provided to user terminal 400 and used to produce a M2M service UI for a desired M2M service.

At step S3080, determination may be made so as to whether application data associated with the user ID and/or a related M2M service is previously generated. For example, the application data may be provided to user terminal 400 and used to produce a M2M service UI for a desired M2M service. The M2M service UI may show a type of M2M service, associated M2M devices installed by the end user, and information on the associated M2M devices. Such information may include current status of M2M devices and usage histories of the associated M2M devices. The M2M service UI may be generated based on the application data. The information of each M2M device may be generated by the combined data associated with each M2M device. Accordingly, such application data may include combined data associated with multiple M2M devices when a user uses multiple M2M devices for a specific M2M service. The previously generated application data may be stored in M2M platform server 110 in associated with a user ID and/or a related M2M service.

At step S3090, the combined data may be embedded to the application data when the application data is previously generated and stored in associated with the user ID and/or a related M2M service (Yes—S3080). For example, M2M platform server 110 embeds the combined data to the application data associated with the same user ID, but the present invention is not limited thereto. User terminal 400 may embed the combined data to the application data associated with the same user ID.

For example, when a first user installed a thermometer as a first M2M device, the first M2M device (thermometer) may be registered with a first UI template. Accordingly, the first M2M device (thermometer) is mapped to the first UI template, which may be expressed as [a user ID of the first user—a model ID of the first M2M device (thermometer)—the first UI template]. Application data may be generated by combining data collected from the first M2M device with the first UI template. Accordingly, a M2M service UI produced based on the application data may be displayed on user terminal 400, as follows:

TABLE 1

| M2M service UI associated with the first user | | |
|---|---|---|
| First user | First M2M device (Thermometer) | First information (Current temperature) |

As shown in Table 1, "First information (current temperature)" may be produced by combining data collected from the first M2M device (thermometer) with the first template. That is, the application data may be generated based on the combined data (the first information) and the M2M service UI may be produced by the application data and displayed on user terminal 400.

When the first user newly installed a second M2M device such as a hygrometer, the second M2M device may be registered with a second UI template. Accordingly, the second M2M device (hygrometer) is mapped to the second UI template, which may be expressed as [a user ID of the first user—a model ID of the second M2M device (hygrometer)—the second UI template]. The application data for the M2M service UI may be generated by combining data collected from the second M2M device and the second UI template and embedding the combined data to the previous application data. Accordingly, the M2M service UI with the embedded application data may be displayed on user terminal 400 as follows:

TABLE 2

| M2M service UI associated with the first user | | |
|---|---|---|
| First user | First M2M device (Thermometer) | First information (Current temperature) |
| | Second M2M device (Hygrometer) | Second information (Current humidity) |

When the application data is not previously generated and stored (No—S3080), application data may be created and stored in association of the user ID at step S3100. For example, M2M platform server 110 may create the application data based on the combined data and store the created application data in memory (106 in FIG. 4), but the present invention is not limited thereto. User terminal 400 may create the application data based on the combined data.

The application data was described as being created by combining the collected data with the retrieved UI template at the steps S3060 to S3100 although the received message includes the registration packet. However, the present invention is not limited thereto. In some embodiments of the present invention, when the received message includes the registration packet, the retrieved UI template may be mapped to the associated model ID and/or the user ID without creating the application data. Accordingly, the steps S3060 to S3100 may be omitted in some embodiments.

When the registration packet is not included in the received message (No—S3030), a UI template associated with a model ID and/or a user ID included in the received message may be retrieved at step S3110. For example, M2M platform server 110 retrieves a UI template associated with M2M device 310 from memory (e.g., memory 106 described subsequently in FIG. 4). In order to retrieve, M2M platform server 110 may extract the model ID and/or the user ID from the received message based on the parsing result. Based on the extracted model ID and/or the user ID, M2M platform server 110 may retrieve an associated UI template from memory (e.g., memory 106 described subsequently in FIG. 4). As described with reference to FIG. 2, the UI template associated with M2M device 310 may be created and stored.

At step S3120, data collected from the associated M2M device may be extracted from the received message. For example, M2M platform server 110 may extract collected data from the received message, but the present invention is not limited thereto. The received message may be delivered to user terminal 400 and user terminal 400 may extract the collected from the message. The collected data may be data collected from M2M device 310 related to a desired M2M service.

At step S3130, the retrieved UI template may be combined with the extracted data. For example, M2M platform server 110 may combine the retrieved UI template with the extracted data, but the present invention is not limited thereto. User terminal 400 may combine the retrieved UI template with the extracted data. Such combined data may be provided to user terminal 400 and used to produce a M2M service UI for a desired M2M service.

At step S3140, application data associated with a user ID may be retrieved. For example, since the message is not for self-registration, the previously generated application data associated with the same user ID and the same M2M service may be present. Accordingly, M2M platform server 110 may retrieve the previously generated application associated with the same user ID and the same M2M service from memory (e.g., memory 106 described subsequently in FIG. 4). The present invention, however, is not limited thereto. In some embodiments, such previously generated application data associated with the same user ID and the same M2M service may be retrieved by user terminal 400.

At step S3150, the combined data may be updated or embedded to the retrieved application data. For example, M2M platform server 110 may update or embed the combined data to the retrieved application data associated with the same user ID, but the present invention is not limited thereto. In some embodiments, user terminal 400 may embed the combined data to the application data associated with the same user ID and/or the same M2M service.

At step S3160, the updated or embedded application data may be stored. For example, M2M platform server 110 may store the updated or embedded application data in memory (106 in FIG. 4).

At step S3170, determination may be made so as whether a request for the application data is received. For example, M2M platform server 110 may determine whether a request for the application data is received. That is, when user terminal 400 receives an input for displaying the M2M service UI from an end user, user terminal 400 may transmit such request to M2M platform server 110. Particularly, an end user may access M2M platform server 110 by inputting a user name with a password into the M2M service UI displayed on user terminal 400.

At step S3180, the requested application data may be provided when there is a request for application data (Yes—S3170). Otherwise, the process returns to the start (No—S3170). For example, M2M platform server 110 may provide user terminal 400 with the application data associated with a user ID of user terminal 400. User terminal 400 may display the M2M service UI based on the received application data. The present invention, however, is not limited thereto. Instead of requesting the application data to M2M platform server 110, user terminal 400 may retrieve the application data stored therein and display the M2M service UI based on the retrieved application in some embodiments.

As described, M2M platform server 110 may combine data collected from M2M device 310 with the associated UI template and update or generate application data based on the combined data in accordance with at least one embodiment of the present invention. Such M2M platform server 110 will be described in detail with reference to FIG. 4.

Figure 4:
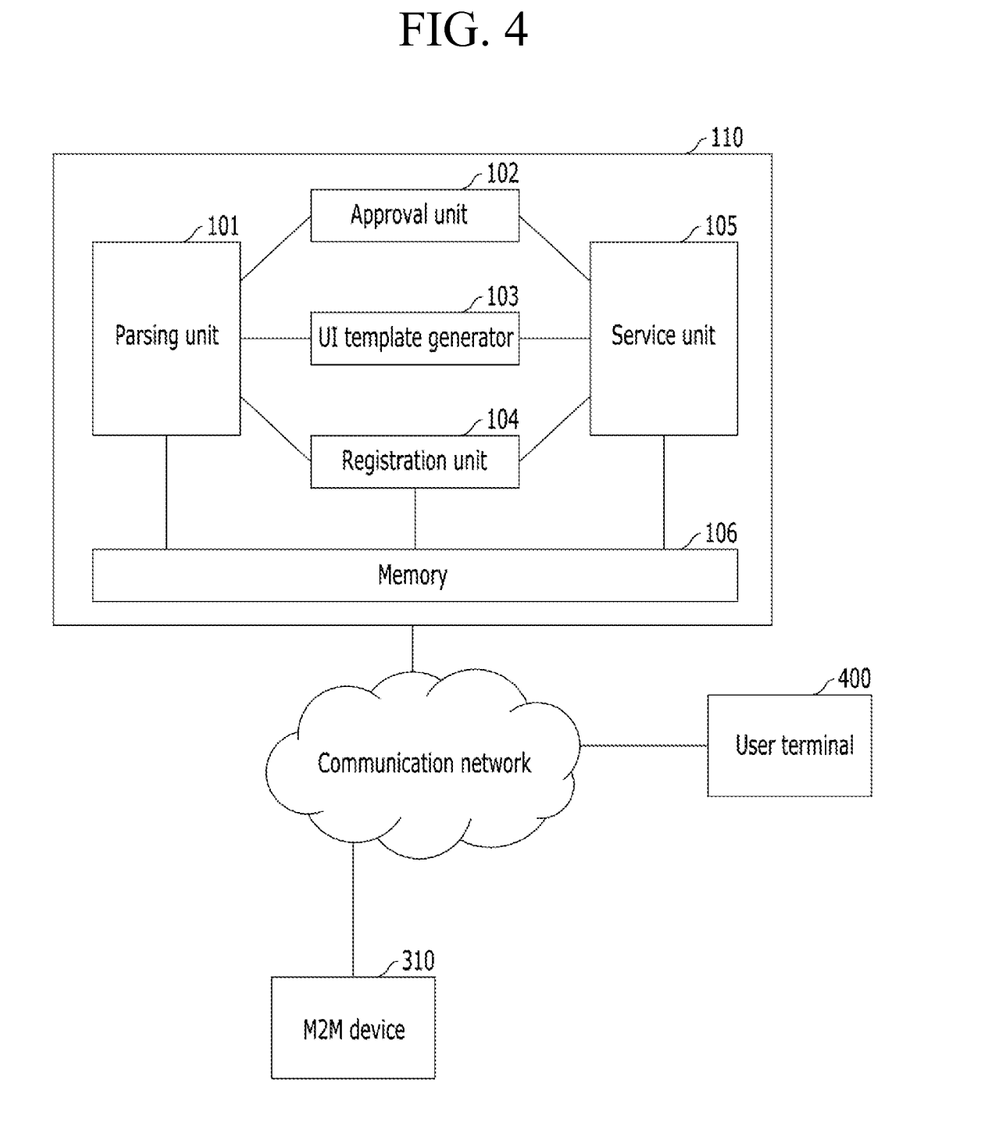
FIG. 4 shows a M2M platform server in accordance with at least one embodiment of the present invention.

FIG. 4 shows a M2M platform server in accordance with at least one embodiment of the present invention.

Referring to FIG. 4, M2M platform server 110 may include parsing unit 101, approval unit 102, UI template generator 103, registration unit 104, service unit 105, and memory 106 in accordance with at least one embodiment of the present invention.

Parsing unit 101 may receive data such as a message from M2M device 310 and extract desired information from the received message. For example, parsing unit 101 may be an extensible markup language (XML) parser. Such an XML parser receives a XML string and decomposes the received XML string into tokens, thereby generating a parse tree. The XML parser may extract desired information from the XML string by analyzing the parse tree. In addition to the extraction of the desired information, parsing unit 110 may check errors in the message. That is, M2M platform server 110 may receive data in a XML format and analyze the received data through parsing unit 101. The received data may include data transmitted from M2M devices and data transmitted from user terminal 400.

Particularly, parsing unit 101 may extract desired information such as a model ID, a MAC ID, a user ID, a registration packet, and collected data from a message received from a M2M device. For example, M2M platform server 110 may receive a message from M2M device 310 when M2M device 310 is initially activated after installation. In this case, the received message may be a notification message including a model ID and a MAC ID of M2M device 310, a user ID associated with M2M device 310. Furthermore, the received message may further include a registration packet and data collected from M2M device 310. The parsing unit 101 may extract such information on the model ID, the MAC ID, the user ID, the registration packet, and the collected data from the received message by parsing the received message and analyzing the parse tree generated as a result of the parsing. Such message or data received from M2M device 310 may be in a format of XML, but the present invention is not limited thereto. The received data may be a JavaScript object notation (Json) data or a CSV data in some embodiments.

Approval unit 102 may inspect a M2M device manufactured by M2M device manufacturer 200 and determine whether the M2M device is manufactured to satisfy requirements for a specific M2M service. Approval unit 102 may provide a development tool to M2M device manufacturer 202 through manufacturing system 210 before M2M device manufacturer 200 manufactures a M2M device. Such development tool may include specification of a desired M2M device. Furthermore, such development tool may be a SDK or a JDK.

After receiving the development tool, M2M device manufacturer 200 may manufacture M2M devices based on the development tool. After manufacturing, M2M device manufacturer 200 may request approval unit 102 to inspect the manufactured M2M devices by transmitting an approval request message to approval unit 102 through manufacturing system 210. In response to the approval request message, approval unit 102 may inspect the manufactured M2M device and determine whether the manufactured M2M device satisfies the requirements for providing a related M2M service based on information in the approval request message. Such information may be a M2M device profile including a model ID, a data type, a data range, a data format, and a control type of the manufactured M2M device. When the manufactured M2M device is approved to satisfy the requirement of the related M2M service or to be applied to the related M2M service, approval unit 102 may store the M2M device profile in memory 106.

UI template generator 103 may create a UI template associated with a M2M device after the M2M device is approved by approval unit 102 in accordance with at least one embodiment of the present invention. Particularly, UI template generator 103 may create UI templates by a type of approved M2M devices. That is, UI templates may be created by a model ID of M2M devices. The created UI template may include information on a data type and a data range of data generated by an associated M2M device, a control type of controlling the associated M2M device, and formats of a graphic user interface (GUI) such as a M2M service UI displayed on user terminal 400. After creation, the UI template may be stored in memory 106 in association with the corresponding M2M device.

Registration unit 104 may register a M2M device with an associated UI template when a notification message including a registration packet is received from the M2M device. Particularly, after approval unit 102 determines that a manufactured M2M device satisfies requirements for providing a specific M2M service, M2M device manufacturer 200 may sell the approved M2M device, such as M2M device 310, directly to an end user through a store. The end user may purchase M2M device 310 and self-install M2M device 310 at a desired location. Upon the initial activation of M2M device 310 after the self-installation, M2M device 310 may transmit a notification message to M2M platform server 110. Such notification message may include a model ID, a MAC ID, and a user ID of an associated M2M device. The notification message may further include a registration packet and data collected from the associated M2M device. Registration unit 104 may map the model ID, the user ID, and the associated UI template. Such mapping may be expressed as [user ID—model ID—UI template] and information thereof may be stored in memory 106. The information related to such mapping may be retrieved and embedded to an associated M2M service, which may be provided through a M2M service UI.

The M2M service may be managed by each user. The M2M service may be provided through a M2M service UI that is produced based on application data and displayed on user terminal 400. Such M2M service UI may show a type of a M2M service associated with a related user, M2M devices installed by the user, information on usage histories of the associated M2M service, and information on current statues of at least one associated M2M device. Such M2M service and M2M service UI may be managed by service unit 105.

Service unit 105 may provide a M2M service to a user based on M2M device data collected from associated M2M devices and manage M2M services each associated with a respective user in accordance with at least one embodiment of the present invention. Particularly, service unit 105 may retrieve a UI template associated to M2M device 310 when receiving data collected from M2M device 310, generate application data by combining collected data with the retrieved UI template, and provide the generated application data to user terminal 400. Based on the application data, user terminal 400 may produce or update a M2M service UI and display the M2M service UI. Through the M2M service UI, service unit 105 may provide a M2M service to an end user. For example, service unit 105 may provide information on a type of a M2M service associated with a related user, M2M devices installed by the user, information on usage histories of the associated M2M service, and current statues of the associated M2M devices by combining data collected from M2M device 310 with the retrieved UI template.

For example, a M2M service UI may be displayed on user terminal 400 as a result of the execution of a M2M application installed in user terminal 400. Through such M2M service UI, an end user may access M2M platform server 110 and request the application data associated with a desired M2M service. In this case, service unit 105 may generate application data by combining collected data with at least one associated IU template and provide the generated application data to user terminal 400. User terminal 400 may produce the M2M service UI based on the application data and display the M2M service UI showing information on the desired M2M service. As described above, service unit 105 can provide a M2M service by reflecting information on M2M devices that may be dynamically added to and removed from the M2M service. That is, service unit 105 can embed information on a newly added M2M device to the M2M service, thereby showing information on the newly installed M2M device through the M2M service UI in accordance with at least one embodiment of the present invention.

Memory 106 may store UI templates created according to the profile of approved M2M devices, such as a model ID, a data type, a data range, a data format, a control type, and so forth. Furthermore, memory 106 may store information on mapping between a model ID and a UI template in association with a user ID. Memory 106 may store a user ID of a user who requests a M2M service through M2M platform server 110 such as a M2M service home page and a MAC ID of a M2M device, which may be received by registration unit 104. Memory 106 may store information on M2M services according to each user.

Figure 5:
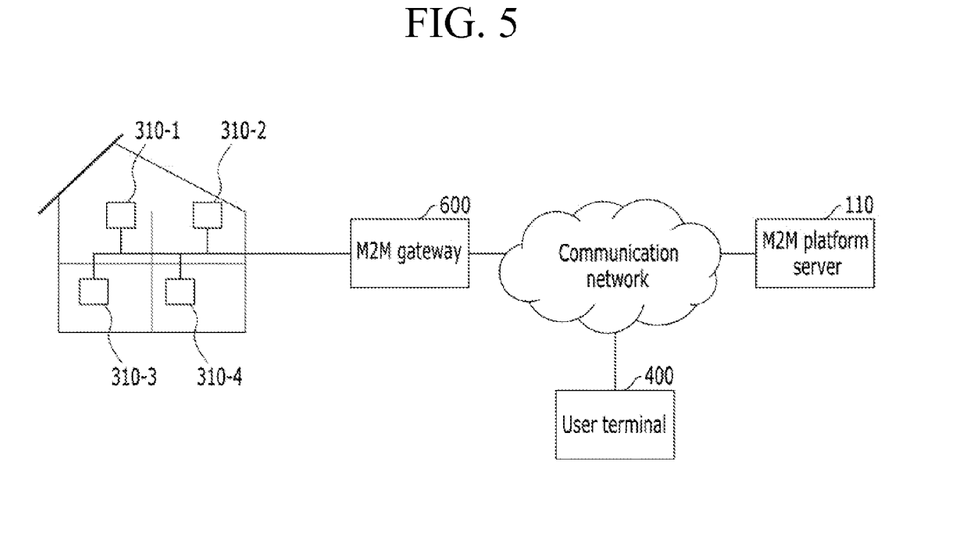
FIG. 5 shows an example of providing a M2M service in accordance with at least one embodiment of the present invention.

FIG. 5 shows an example of providing a M2M service in accordance with at least one embodiment of the present invention.

Referring to FIG. 5, it shows an example of providing a M2M service when fourth M2M device 310-4 is additionally installed at home while a first user uses a home control M2M service through user terminal 400 by using first to third M2M devices 310-1, 310-2, and 310-3 installed in home. In order to use such a home control M2M service before additionally installing fourth M2M device 310-4, the first user initiates an associated M2M application installed in user terminal 400. Then, a M2M service UI is displayed on user terminal 400. The first user may access M2M platform server 110 by entering a user name and a password through the M2M service UI. After accessing, the M2M service UI may interact with M2M platform server 110, receive application data from M2M platform server 110, and provide information on the home control M2M service, such as current status of first to third M2M devices, based on the received application data.

Particularly, first to third M2M devices 310-1, 310-2, and 310-3 collect or sense data such as temperature, humidity, or motion and transmit the collected data to M2M platform server 110 through M2M gateway 600 and a communication network. Upon the receipt of the collected data from first to third M2M devices 310-1 to 310-3, M2M platform server 110 retrieves UI templates corresponding to first to third M2M devices 310-1 to 310-3 based on mapping information between model IDs of first to third M2M devices 310-1 to 310-3 and UI templates. M2M platform server 110 respectively combines the collected data and the retrieved UI templates and creates application data based on the combined data. M2M platform server 110 provides the generated application data to user terminal 400. User terminal 400 may produce or update a M2M service UI with latest information based on the provided application data and display the M2M service UI. Such M2M service UI may show information on the M2M service as follows:

TABLE 3

| M2M service UI associated with the first user | | |
|---|---|---|
| First user | First M2M device 310-1 | First information |
| | Second M2M device 310-2 | Second information |
| | Third M2M device 310-3 | Third information |

While receiving the M2M service, the first user purchases a new M2M device such as fourth M2M device 310-4 from a store. Such fourth M2M device 310-4 is manufactured based on a development tool provided from approval unit 102 of M2M platform server 110. That is, M2M device manufacturer 200 manufactures the fourth M2M device 310-4 based on the development tool and request approval unit 102 to inspect the fourth M2M device 310-4 whether the manufactured fourth M2M device 310-4 satisfies the requirements for providing the home control M2M service to the first user. The approval procedure may be preformed based on a M2M device profile transmitted to approval unit 102 when the approval is requested to approval unit 102. The M2M device profile may include information on a data type, a data range, and a data format of data generated by fourth M2M device 130-4 and a control type for controlling fourth M2M device 130-4.

After approval unit 102 approves that fourth M2M device 310-4 satisfies the requirements for providing the home control M2M service, UI template generator 103 may generate a fourth UI template for fourth M2M device 310-4. The created fourth UI template may include information on a data type, a data range, and a data format of data generated by fourth M2M device 310-4, a control type of controlling fourth M2M device 310-4, and a format of a graphic user interface for displaying data collected from fourth M2M device 310-4 and controlling fourth M2M device 310-4. After the creation of the fourth UI template, M2M platform server 110 may map the fourth UI template to fourth M2M device 310-4 and store the mapping information.

M2M device manufacturer 200 sells fourth M2M device 310-4 directly to the first user and the first user purchases fourth M2M device 310-4 from the store. The first user self-installs fourth M2M device 310-4 at a desired location of home and activates the fourth M2M device. Upon the activation of fourth M2M device 310-4, fourth M2M device 310-4 transmits a message to M2M platform server 110. The message may be a notification message when fourth M2M device 310-4 is initially activated after the self-installation. Such notification message may include a model ID and a MAC ID of fourth M2M device 310-4, a user ID of the first user associated with fourth M2M device 310-4, a registration packet, and data collected from fourth M2M device 310-4. When M2M platform server 110 receives the message from fourth M2M device 310-4, parsing unit 101 may extract the model ID and the MAC ID of fourth M2M device 310-4, the user ID of the first user, the registration packet, and the collected data by analyzing the received notification message. M2M platform server 110 may retrieve the fourth UI template based on the extracted model ID and/or the MAC ID and register fourth M2M device 310-4 with the retrieved fourth UI template, which may be referred to a self-registration. M2M platform server 110 maps the user ID with the model ID and the fourth UI template [user ID— model ID—fourth UI template], and store the mapping information.

After such self-registration, the first user accesses M2M platform server 110 through the M2M service UI displayed on user terminal 400. M2M platform server 110 may receive messages from fourth M2M device 310-4 as well as first to third M2M devices 310-1 to 310-3. Parsing unit 101 may extract desired information such as a model ID, a MAC ID, and a user ID from the received message from fourth M2M device 310-4. Furthermore, parsing unit 101 may extract data collected from fourth M2M device 310-4. Service unit 105 may retrieve the fourth UI template based on the extracted model ID of fourth M2M device 310-4 and combine the retrieved fourth UI template with the collected data extracted from the message. Service unit 105 may embed the combined data of fourth M2M device 310-4 to the application data associated with the first user, which is previously generated and updated with latest information by respectively combining data collected from first to third M2M devices 310-1 to 310-3 with the first to third UI templates. That is, the application data associated with the first user and the home control M2M service is updated with information on additionally installed fourth M2M device 130-4. Service unit 105 may provide the application data to user terminal 400. User terminal 400 may produce the M2M service UI and display the M2M service UI with information on fourth M2M device 310-4. Such a M2M service UI might show:

TABLE 4

M2M service UI associated with the first user

| First user | First M2M device 310-1 | First information |
| | Second M2M device 310-2 | Second information |
| | Third M2M device 310-3 | Third information |
| | Fourth M2M device 310-4 | Fourth information |

As shown in Table 4, the M2M service UI additionally shows the fourth information which is information on additionally installed fourth M2M device 310-4. As described, such fourth information may include current status of fourth M2M device 310-4. The first user may control fourth M2M device based on the fourth information provided through the M2M service UI displayed on user terminal 400. As described, the first user is enabled to receive the fourth information of newly installed fourth M2M device 310-4 through the existing M2M service UI without recreating or reconfiguring the M2M application of the M2M service UI in accordance with at least one embodiment of the present invention. Furthermore, the M2M service UI may include icons or menus for receiving an input from the first user. Based on such input from the first user, M2M platform server 110 may process at least one of the first to fourth information and provide the processing result to the first user through the M2M service UI.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of providing a machine to machine (M2M) service to a user by a server connected to a M2M device and a user terminal through a communication network, wherein the M2M device is installed at a predetermined location for collecting desired data associated with the M2M service, and the user terminal is located at a remote location separated from the M2M devices and is configured to receive the M2M service from the server based on information collected by the M2M device, the method comprising:
    retrieving a user interface (UI) template associated with the M2M device when a message is received from the M2M device, wherein the message is generated and transmitted by the M2M device when the M2M device performs a self-registration procedure after installing the M2M device at a predetermined location to collect desired data for the M2M service;
    combining data collected from the M2M device with the retrieved UI template; and
    providing, to the user terminal, a M2M service associated with the M2M device by embedding the combined data to application data, the embedding producing a M2M service user interface (UI) of the associated M2M service,
    wherein the UI template is a set of rules and settings for processing and providing data collected from the M2M device and includes information on a data type, a data range, a and data format of data produced by the M2M device,
    wherein the combining data collected from the M2M device with the retrieved UI template includes:
    extracting the collected data from the received message; and
    generating information on the M2M device shown through the M2M service UI by combining the extracted data with the retrieved UI template, and
    wherein the providing a M2M service associated with the M2M device includes:
    determining whether application data associated with the M2M service is previously generated;
    embedding the combined data to the previously generated application data when the application data is previously generated; and
    transmitting the application data with the combined data embedded to the user terminal,
    wherein the generated information on the M2M device is displayed on the user terminal through the M2M service UI produced based on the application data with the embedded combined data and displayed on the user terminal.

2. The method of claim 1, wherein the retrieving includes:
    extracting identification (ID) of the M2M device from the message; and
    retrieving the UI template having a mapping relation with the extracted ID.

3. The method of claim 2, wherein the ID of the M2M device is at least one of a model ID and a MAC ID of the M2M device.

4. The method of claim 2, comprising establishing the mapping relation between the UI template and the M2M device by a self-registration process.

5. The method of claim 4, wherein the establishing by the self-registration process includes:
    receiving a notification message for initiating the self-registration process from the M2M device;
    finding a UI template associated with the notification message based on an ID of the M2M device, which is included in the notification message;
    establishing a mapping relation among an associated user, the M2M device, and the UI template; and
    storing the mapping relation among the associated user, the M2M device and the UI template.

6. The method of claim 5, wherein the receiving a notification message includes:
    receiving a message from the M2M device;
    analyzing whether the received message includes a registration packet; and
    determining that the received message is the notification message when the received message includes the registration packet.

7. The method of claim 5, wherein the notification message is transmitted from the M2M device when the M2M device is initially activated after a user self-installs the M2M device at a desired location.

8. The method of claim 1, wherein:
    the retrieved UI template is a set of rules and settings employed by processing and providing data collected from an associated M2M device to the associated user terminal; and
    the retrieved UI template includes information on a data type, a data range, a data format of data produced by the M2M device, a control type of controlling the M2M device, and formats of an associated graphic user interface to be displayed on the associated user terminal for displaying information on the M2M device.

9. The method of claim 1, wherein:
    the previously generated application data is produced by combining data collected from at least one of other M2M devices associated with the M2M service and the associated user terminal with respective UI templates; and
    the previously generated application data is previously transmitted to the associated user terminal displaying information on the other M2M devices through a M2M service UI produced and displayed on the user terminal based on the previously generated application data.

10. The method of claim 1, wherein the providing a M2M service associated with the M2M device includes:
    generating application data based on the combined data when the application is not previously generated; and
    transmitting the generated application data to the associated user terminal,
    wherein the associated user terminal produces the M2M service UI based on the application data and displays information on the M2M device through the M2M service UI.

11. The method of claim 1, prior to the retrieving a UI template, the further comprising:
    providing a development tool to a manufacturing system of a M2M device manufacturer to request manufacturing the M2M device for providing the M2M service;
    receiving a profile of a manufactured M2M device from the M2M device manufacturer through the manufacturing system; and
    determining whether a manufactured M2M device satisfies requirements for providing the M2M service based on the received profile of the manufactured M2M device.

12. The method of claim 11, further comprising:
creating a UI template associated with the manufactured M2M device when the manufactured M2M device satisfies the requirements for providing the M2M service; and
storing a mapping relation between the created UI template and the manufactured M2M device.

13. An apparatus for providing a machine to machine (M2M) service, wherein the apparatus is connected to a M2M device and a user terminal through a communication network, the M2M device is installed at a predetermined location for collecting desired data associated with the M2M service, and the user terminal is located at a remote location separated from the M2M devices and is configured to receive the M2M service from the apparatus based on information collected by the M2M device, the apparatus is configured to:
retrieve a user interface (UI) template associated with the M2M device when a message is received from the M2M device, wherein the message is generated and transmitted by the M2M device when the M2M device performs a self-registration procedure after installing the M2M device at a predetermined location to collect desired data for the M2M service;
combine data collected from the M2M device with the retrieved UI template; and
provide, to the user terminal, a M2M service associated with the M2M device by embedding the combined data to application data for producing a M2M service user interface (UI) of the associated M2M service,
wherein the UI template is a set of rules and settings for processing and providing data collected from the M2M device and includes information on a data type, a data range, and a data format of data produced by the M2M device,
wherein the apparatus comprises a parsing unit configured to:
receive a notification message initiating the self-registration process from the M2M device;
find a UI template associated with the notification message based on an ID of the M2M device, which is included in the notification message;
establish a mapping relation among the associated user terminal, the M2M device, and the UI template; and
store the mapping relation among the associated user terminal, the M2M device and the UI template in a memory of the apparatus, and a service unit configured to:
determine whether application data associated with the M2M service is previously generated,
embed the combined data to the previously generated application data when the application data is previously generated, and
transmit the application data with the combined data embedded to the associated user terminal; and
wherein the generated information on the M2M device is displayed through the M2M service UI produced based on the application data with the combined data embedded.

14. The apparatus of claim 13, wherein:
the previously generated application data is produced by combining data collected from at least one of other M2M devices associated with the M2M service and the associated user terminal with respective UI templates; and
the previously generated application data is previously transmitted to the associated user terminal for displaying information on the other M2M devices through a M2M service UI produced and displayed on the associated user terminal based on the previously generated application data.

15. The apparatus of claim 13, wherein the apparatus is configured to:
provide a development tool to a manufacturing system of a M2M device manufacturer to request manufacturing the M2M device for providing the M2M service;
receive a profile of a manufactured M2M device from the M2M device manufacturer through the manufacturing system; and
inspect a manufactured M2M device to determine whether the manufactured M2M device satisfies requirements for providing the M2M service based on the received profile of the manufactured M2M device.

16. The apparatus of claim 15, wherein the apparatus is configured to:
create a UI template associated with the manufactured M2M device when the manufactured M2M device is determined as satisfying the requirements for providing the M2M service; and
store a mapping relation between the created UI template and the manufactured M2M device.

\* \* \* \* \*